Feb. 22, 1938.  C. A. GALLUPE  2,109,384
SPRAYING ATTACHMENT FOR TRACTORS
Filed June 25, 1937  2 Sheets-Sheet 1
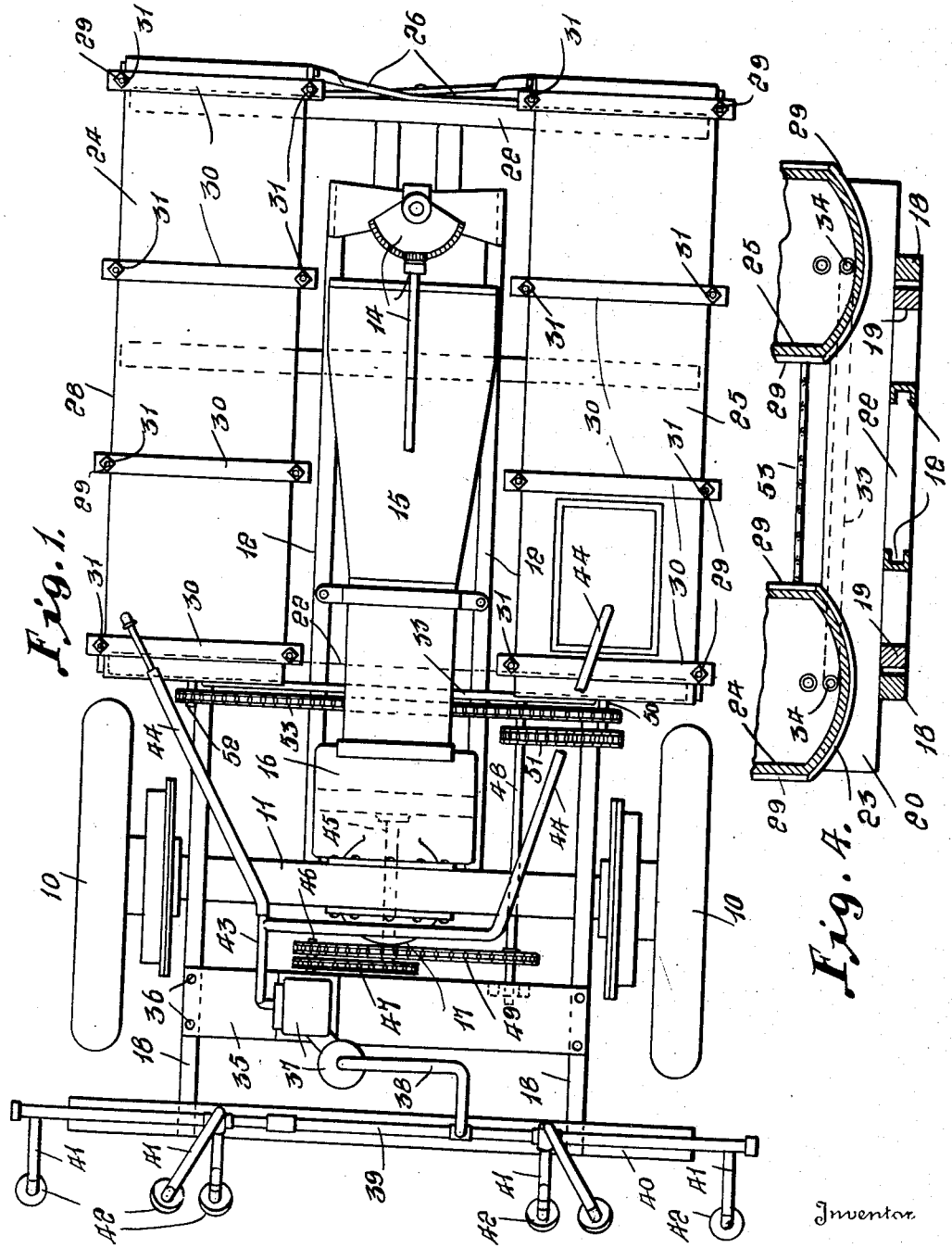
Inventor
C. A. Gallupe
By
Attorney

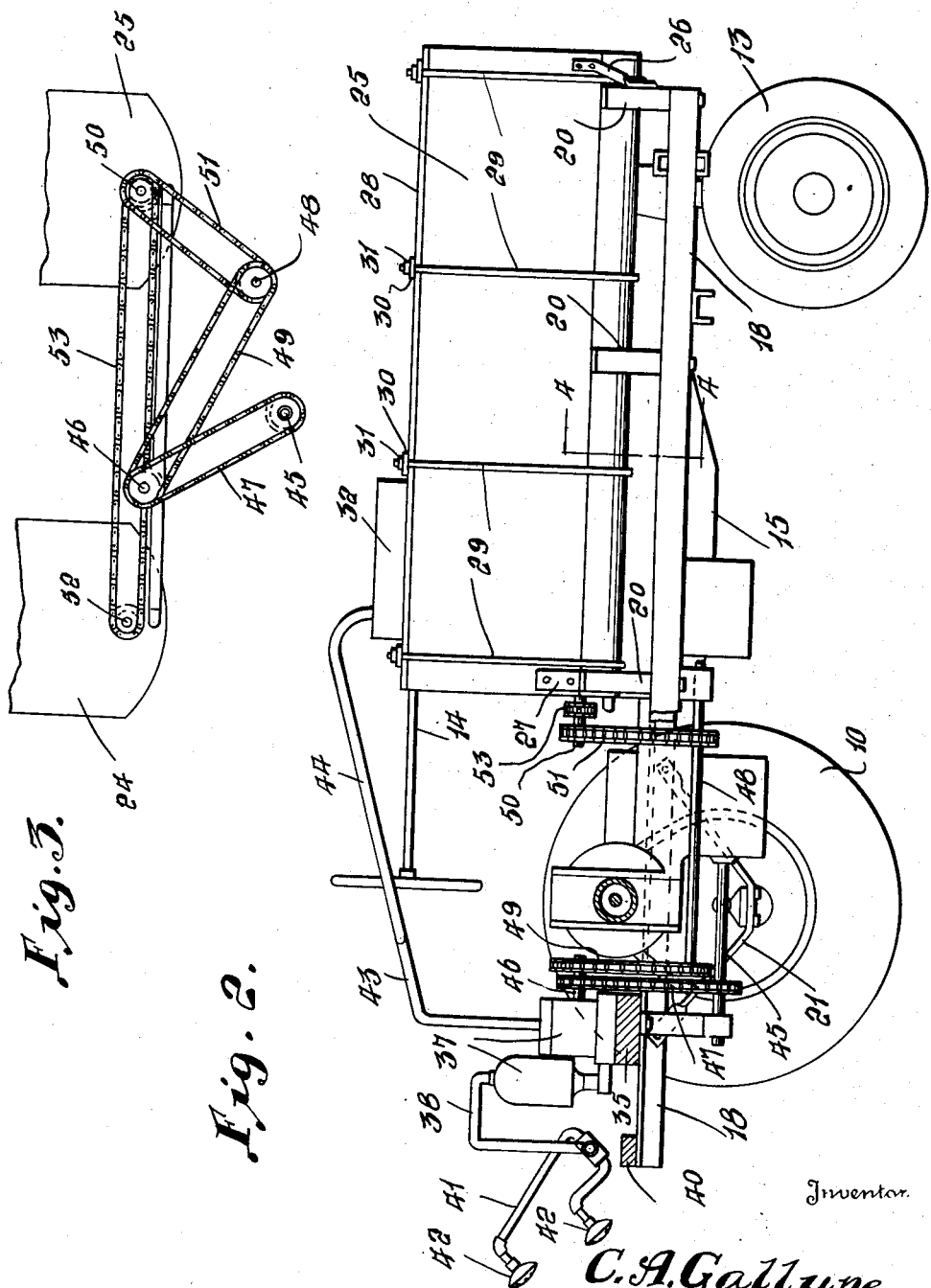

Patented Feb. 22, 1938

2,109,384

UNITED STATES PATENT OFFICE 2,109,384

SPRAYING ATTACHMENT FOR TRACTORS

Charles A. Gallupe, Mars Hill, Maine

Application June 25, 1937, Serial No. 150,402

3 Claims. (Cl. 299—30)

This invention relates to certain new and useful improvements in spraying attachment for tractors.

The primary object of the invention is to provide a spraying attachment for tractors of standard construction without in any manner altering the construction of the tractor, the spraying attachment embodying a pair of tanks supported on the tractor forwardly of the rear axle and motor drive with the tanks respectively positioned forwardly of the rear ground wheels of the tractor to provide a better balanced structure and to facilitate removal of the tanks and other parts of the spraying attachment from the tractor frame.

A further object of the invention is to provide a spraying attachment for tractors of standard construction wherein the spraying attachment includes a skeleton frame structure adapted to be attached to the frame of the tractor and a pair of laterally disposed tanks for insecticide or other spraying solution positioned forwardly of the motor drive and rear ground wheels of the tractor with means to facilitate discharge of the spraying solution rearwardly of the tractor, the spraying attachment being mounted upon the tractor substantially within the extreme dimensions of the tractor so that the latter may be easily maneuvered.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a top plan view of a spraying attachment for tractors illustrated in its assembled relation to the tractor;

Figure 2 is a side elevational view, partly broken away and shown in section, showing the driving connections from the tractor motor to the spraying pump and tank agitators;

Figure 3 is a diagrammatic view showing the two spray solution tanks and the driving connections from the tractor motor to the spraying pump and tank agitators; and Figure 4 is a detail cross-sectional view taken on line 4—4 of Figure 2.

The standard tractor illustrated comprises the rear drive wheels 10 supported by axles within the rear axle housing 11, frame bars 12 extending forwardly of the rear axle housing 11 for the support of forwardly positioned steering wheels 13 controlled in their operation by the steering devices 14. A motor drive designated in general by the reference character 15 is supported on the frame bars 12, the motor drive 15 including transmission mechanism 16 in communication with differential mechanism in the housing 17 associated with the rear axle housing 11 as shown in Figure 1.

The spraying attachment for the tractor is attached thereto without altering the construction of the tractor and includes a base frame adapted for attachment to the tractor frame bars 12 to extend laterally of the motor drive 15 and rearwardly over the rear axle housing 11 for support thereon. The base frame of the spraying attachment includes a pair of side bars 18 of angle iron formation as shown in Figure 2 that extend from a point slightly rearwardly of the rear axle housing 11 to a forward point slightly in advance of the motor drive 15 as shown in Figure 1 for support on the rear axle housing 11, another side bar 19 being disposed in proximity of each side bar 18 and extending from points slightly forwardly of the rear ground wheels 11 to the forward ends of the bars 18, the bars 18 and 19 being arranged in pairs respectively at opposite sides of the motor drive 15 and connected together by bolsters 20 superposed thereon and extending transversely thereof, the bolsters being secured to the side bars in any convenient manner, the intermediate portions of the bolsters 20 being supported on the frame bars 12 of the tractor. Strap irons 21 detachably secure the rear ends of the side bars 18 to the rear axle housing 11 as shown in Figure 2. The side bars 18 and 19 are further connected together by means of cross-bars 22 at the front and rear ends of the bars 19.

As shown in Figure 4, each bolster 20 has a curved seat 23 adjacent each end thereof for the support of a pair of tanks 24 and 25 extending longitudinally of the apparatus and respectively positioned at opposite sides of the motor drive 15, the tanks 24 and 25 being retained in position on the bolsters 20 by means of front end anchor devices 26 extending between the tanks and the forwardly positioned bolsters 20 and further secured to the rear bolsters by straps 27 shown in Figure 2. The tanks 24 and 25 are each provided with a removable cover 28 retained thereon by U-shaped tie rods 29 enclosing the bottom and sides of the tank with the upper threaded ends thereof receiving cross bars 30 extend across the top wall 28 and retained thereon by nuts 31. The cover 28 for the tank 25 is provided with a filling opening closed by a removable cover 32, as shown in Figures 1 and 2. The tanks 24 and 25 communicate with each other through the medium of a tube 33 extending between the rear ends of the tanks and entering the tanks at the bottoms thereof as shown at 34 in Figure 4.

A platform bar 35 extends transversely of the side bars 18 rearwardly of the axle housing 11 and is anchored at its ends as at 36 to said side bars, a pump 37 being mounted upon the platform bar 35 and having an outlet pipe 38 communicating with a manifold pipe 39 disposed above an end transversely extending bar 40 carried by the rear terminal ends of the side bars 18, spray pipes 41 carrying nozzles 42 being carried by the manifold pipe 39 for discharging and spraying the insecticide or other spraying fluid rearwardly of the tractor. A pipe 43 extending from the pump 37 has branch connections 44 with the tanks 24 and 25, the pump drawing the spray solution from the tanks for discharge through the spray nozzles 42.

Mixers or agitators for the spraying fluid are provided in each of the tanks 24 and 25 and power for the operation of the agitators and pump 37 is derived from the motor drive 15. A power shaft 45 is driven from the motor of the tractor, the driving devices being mechanically illustrated in Figures 1 and 2 and diagrammatically illustrated in Figure 3, the drive shaft 45 having a sprocket wheel thereon communicating rotary motion to the pump shaft 46 through the medium of a sprocket chain 47. A second sprocket wheel on the pump shaft 47 communicates motion to the counter-shaft 48 through the medium of the sprocket chain 49 and a second sprocket wheel on the counter-shaft 48 communicates rotary motion to the agitator shaft 50 in the tank 25 through the medium of the sprocket chain 51. The agitator shaft 52 in the tank 24 has a sprocket wheel that is driven by a sprocket chain 53 that also passes over a second sprocket wheel on the agitator shaft 50 in the tank 25.

From the above detailed description of the invention, it is believed that the construction and use thereof will at once be apparent, it being noted that the spraying attachment including its base frame is readily attachable to a tractor of standard construction, the tanks for the spraying solution being arranged in a pair with a tank respectively positioned at each side of the drive 15 and forwardly of the rear ground wheels 10, with the spraying mechanism well balanced upon the tractor frame, and while there is herein shown and described the preferred embodiment of the invention, it is nevertheless to be understood that minor changes may be made therein without departing from the spirit and scope of the invention as claimed.

I claim:—

1. A spraying apparatus adapted to be attached to a tractor, wherein the tractor embodies rear traction wheels and a forward power plant, a frame structure adapted to be secured to the tractor in overlying relation thereto, two communicating tanks carried by the frame structure respectively at opposite sides of the power plant of the tractor and forwardly of the traction wheels, the frame structure extending rearwardly of the traction wheels, a pump supported on the rearwardly extending frame portion, means forming communication between the pump and tanks, spray devices rearwardly of the pump and in communication therewith and operative connections between the pump and power plant.

2. A spraying apparatus adapted to be attached to a tractor, wherein the tractor embodies rear traction wheels and a forward power plant, a frame structure adapted to be secured to the tractor in overlying relation thereto, two communicating tanks carried by the frame structure respectively at opposite sides of the power plant of the tractor and forwardly of the traction wheels, the frame structure extending rearwardly of the traction wheels, a pump supported on the rearwardly extending frame portion, means forming communication between the pump and tanks, spray devices rearwardly of the pump and in communication therewith and operative connections between the pump and power plant, the operative connections between the pump and power plant including a drive shaft extending from the power plant, and a drive connection between the power shaft and pump.

3. A spraying apparatus adapted to be attached to a tractor, wherein the tractor embodies rear traction wheels and a forward power plant, a frame structure adapted to be secured to the tractor in overlying relation thereto, two communicating tanks carried by the frame structure respectively at opposite sides of the power plant of the tractor and forwardly of the traction wheels, the frame structure extending rearwardly of the traction wheels, a pump supported on the rearwardly extending frame portion, means forming communication between the pump and tanks, spray devices rearwardly of the pump and in communication therewith and operative connections between the pump and power plant, the operative connections between the pump and power plant including a drive shaft extending from the power plant and a drive connection between the power shaft and pump, an agitator in each tank, drive connections between the agitators and drive connections between the pump shaft and one of the agitators.

CHARLES A. GALLUPE.